Patented Oct. 8, 1940

2,217,650

UNITED STATES PATENT OFFICE 2,217,650

PREPARATION OF ORGANIC ACIDS

Donald J. Loder, Wilmington, Del.

No Drawing. Application June 26, 1937,
Serial No. 150,547

7 Claims. (Cl. 260—532)

This invention relates to a process for the formation of organic compounds and particularly to the preparation of aliphatic organic acids by the interaction of olefines, aliphatic alcohols, aliphatic ethers or aliphatic esters with carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst, acetic acid, methyl acetate, and methyl formate may be prepared in proportions which are governed by the particular operating conditions.

An object of this invention is to provide improvements in processes for the preparation of higher molecular weight organic compounds thru the introduction of carbon monoxide into the lower molecular weight organic compounds. A further object is to provide a process for the preparation of monocarboxylic acids by the condensation of an aliphatic alcohol with a carbon oxide in the presence of a catalyst. Another object is to provide a process for the preparation of acids having the structural formula $$C_nH_{2n+1}COOH$$

from alcohols having the structural formula $C_nH_{2n+1}OH$ 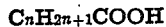 by subjecting the alcohols to the action of the carbon monoxide in the presence of a phosphoric acid-boron trifluoride or sulfuric acid-boron trifluoride catalyst, with or without the presence of absorbent materials, such as pumice, silica gel, active carbon, etc. Other objects will hereinafter appear.

The above objects can be realized by passing under suitable pressure and temperature conditions a vaporized aliphatic monohydroxy alcohol and carbon monoxide, over an inorganic acid-boron fluoride catalyst, supported, if desired, on silica gel, kieselguhr, active carbon or, more particularly, on activated charcoal. The products resulting from such a reaction will contain generally a mixture of, among other compounds, aliphatic carboxylic acids, some of which have a greater, some a lesser, number of carbon atoms than are present in the alcohol treated,—an aliphatic acid containing one more carbon atom than the alcohol usually predominating.

Catalysts which I have found particularly suitable for this process are commonly called by the chemist complexes and are prepared from inorganic acids and boron trifluoride. More particularly, my preferred catalysts are the phosphoric acid-boron trifluoride, sulfuric acid-boron trifluoride and hydrochloric acid-boron trifluoride complexes. It is to be understood that corresponding complexes of other boron halides, such as boron chloride, boron bromide and boron iodide, are likewise suitable, but, owing to the ease of preparation and activity of the catalyst, I prefer to employ the complex which contains an inorganic acid and boron trifluoride.

I shall now designate methods of preparing my preferred catalysts, but it will be understood that the examples are merely illustrative and do not limit the scope of the invention.

*Example 1.*—245 parts by weight of orthophosphoric acid are saturated at approximately 30° C. with boron trifluoride. An increase in weight of approximately 275 parts takes place and a viscous, fuming liquid is obtained.

*Example 2.*—250 parts by weight of orthophosphoric acid are saturated between 80 and 100° C. with boron trifluoride. The increase in weight amounts to approximately 176 parts.

*Example 3.*—Boron trifluoride is passed into concentrated sulfuric acid maintained at a temperature of 30° C. until the latter becomes saturated. An increase in weight of approximately 70% of the amount of sulfuric acid employed is realized.

The alcohol-carbon monoxide reaction which can be accelerated by the above described catalysts may be expressed as follows:

$$C_nH_{2n+1}OH + CO \rightarrow C_nH_{2n+1}COOH$$

In accordance with the particular operating conditions, it will be found that, in some instances, the acid may not be formed directly in the free state, but may be produced as the ester of the alcohol. The alcohols used may be replaced, if desired, wholly or partly by the corresponding alkyl ethers of the alcohols, such as dimethyl ether, diethyl ether, or the mixed alkyl ethers; by the alkyl esters, the alkyl amines, or the alkyl halides; or by the olefines, such as ethylene, proplyene, butylene, isobutylene, butadiene, etc. It is advantageous, altho not essential, to have water vapor present during the methanol-carbon monoxide to acetic acid reaction. This is true also when the reaction is conducted with compounds which decompose to give the alcohol and is especially advantageous when the compound is such that it forms the alcohol by hydrolysis. It is essential that water vapor be present when olefines are reacted, if it is desired to produce acids.

The synthesis can generally be efficiently carried out under the following operating conditions. The pressure may vary from approximately 25 atmospheres to 900 atmospheres or higher with the preferable operating range in the neighborhood of 350-700 atmospheres. These pressures do not differ materially from those used when other types of catalysts are employed for this synthesis nor do the temperatures vary appreciably from those already known for reactions of this type. For example, the process can be suitably carried out, with my catalyst, at temperatures of between 150-400° C., but still higher or lower temperatures may also be used in some cases, the speed of the reaction being increased by the use of higher temperatures.

The carbon monoxide used may be obtained from various commercial sources, such, for example, as from water gas, producer gas, coke oven gas, etc., but to obtain products of the highest degree of purity it is preferable to remove from such commercial gases the objectionable constituents such as sulfur compounds, metal, carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohols and carbon monoxide on one pass through the conversion apparatus. Other strictly inert gases usually act similarly. It is, of course, understood that instead of introducing methanol itself into the reaction chamber substances or mixtures of substances which decompose by hydrolyzing, for example, to form alcohols or which decompose to form esters or ethers may be employed, but, generally, I prefer to introduce methanol directly into the gas stream.

My process can be conveniently carried out by passing purified carbon monoxide into aqueous methanol maintained at such a temperature that the issuing gases will have the requisite proportion of methanol, carbon monoxide, and a portion of the desired water vapor. The catalyst may, if water miscible, be dissolved in water which may be injected into the system to give the desired amount of catalyst and total water vapor. Or alternatively the catalyst may be dissolved in aqueous methanol and the resulting solution injected into the carbon monoxide stream prior to the reaction. I have found that a gaseous composition, containing an excess of carbon monoxide over the methanol vapor, will give a good yield of acetic acid and its ester on one pass thru a converter, the temperature of the reaction chamber being maintained at approximately 375° C. and the pressure held in the neighborhood of 700 atmospheres.

Not only can methanol be catalyzed in the presence of carbon monoxide and my catalyst to acetic acid, or methyl acetate, but the higher alcohols, such as ethyl alcohol, propyl alcohol, butyl alcohol, and even the higher molecular weight alcohols, such, for example, as hexyl alcohol or octyl alcohol, may be similarly converted into an acid having one more carbon atom than the alcohol treated. In fact, my process and catalyst may be employed with any of the monohydric alcohols, providing these alcohols volatilize without decomposition under the conditions existing during the reaction. When converting the higher aliphatic alcohols, some of which are not water soluble, and particularly if water is desired in the reaction, it is preferable, generally, to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds, I may utilize in lieu of the alcohols, the ethers, amines, halides, or esters thereof, the use of which will result in a good conversion with generally some slight modification in the ratio of acid to other products obtained.

I shall now describe specific embodiment of the use of my catalysts, but it will be understood that the details therein given and the compounds employed, either as reactants or catalysts, in no way restrict the scope of this invention, but merely illustrate methods by which my process may be carried out.

*Example 4.*—A gaseous mixture, containing 85% carbon monoxide and 5% each of methanol, water vapor, and hydrogen, is passed together with approximately 0.125% of a phosphoric acid-boron fluoride, prepared as in Example 1, catalyst over activated charcoal which is disposed in a conversion chamber suitable for the carrying out of gaseous exothermic reactions. The reaction is conducted at a temperature of approximately 325° C. and a pressure of approximately 700 atmospheres. Upon condensation of the products of the reaction a good yield of acetic acid is obtained together with a small amount of other aliphatic acids.

*Example 5.*—Into a pressure-resisting autoclave containing methanol, there are passed a molecular equivalent weight of the phosphoric acid-boron trifluoride catalyst obtained in accord with the process described in Example 1, together with three mols of water. To the resulting mixture carbon monoxide is introduced until a pressure of 700 atmospheres is attained. The temperature is held at approximately 260° C. and the reaction is continued until analysis shows that an equivalent weight of carbon monoxide is reacted.

The pressure is released, the temperature of the reaction mass cooled and a crude product distilled. An aqueous acetic acid distills over, giving a yield of approximately 75%.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces of the apparatus with chromium or silver, or using for the construction of this equipment acid-resisting alloy steels containing, for example, molybdenum, cobalt, tungsten, chromium, manganese or nickel.

From a consideration of the above specification it will be realized that many changes may be made in the details therein shown, without in any way departing from the scope of the invention.

I claim:

1. In a process for the preparation of aliphatic organic acids and their esters by the interaction of carbon monoxide with a compound selected from the group consisting of saturated aliphatic monohydric alcohols, and compounds which upon hydrolysis give saturated monohydric aliphatic alcohols, at a temperature between 150° C. and 400° C. and a pressure between 25 and 900 atmospheres, the step which comprises conducting the reaction in the presence of an inorganic acid-boron fluoride complex obtainable by the absorption of boron fluoride in an inorganic acid.

2. In the process for the preparation of aliphatic organic acids by the interaction of carbon monoxide with a compound selected from the group consisting of saturated aliphatic monohydric alcohols, and compounds which upon hydrolysis give saturated monohydric aliphatic alcohols, at a temperature between 150° C. and 400° C. and a pressure between 25 and 900 atmospheres, the step which comprises conducting the reaction in the presence of a phosphoric acid-boron fluoride complex, obtainable by the absorption of boron fluoride in phosphoric acid.

3. In a process for the preparation of aliphatic organic acids by the interaction of carbon monoxide with a compound selected from the group consisting of saturated aliphatic monohydric alcohols, and compounds which upon hydrolysis give saturated monohydric aliphatic alcohols, at a temperature between 150° C. and 400° C. and a pressure between 25 and 900 atmospheres, the step which comprises conducting the reaction in the presence of a sulfuric acid-boron fluoride complex, obtainable by the absorption of boron fluoride in sulfuric acid.

4. In a process for the preparation of aliphatic organic acids by the interaction of carbon monoxide with a compound selected from the group consisting of saturated aliphatic monohydric alcohols, and compounds which upon hydrolysis give saturated monohydric aliphatic alcohols, at a temperature between 150° C. and 400° C. and a pressure between 25 and 900 atmospheres, the step which comprises conducting the reaction in the presence of a hydrochloric acid-boron fluoride complex, obtainable by the absorption of boron fluoride in hydrochloric acid.

5. In a process for the preparation of aliphatic organic acids by the interaction of carbon monoxide with a compound selected from the group consisting of saturated aliphatic monohydric alcohols, and compounds which upon hydrolysis give saturated monohydric aliphatic alcohols, at a temperature between 150° C. and 400° C. and a pressure between 25 and 900 atmospheres, the step which comprises conducting the reaction in the presence of an orthophosphoric acid-boron fluoride complex, obtainable by saturating orthophosphoric acid at 30° C. with boron fluoride.

6. In a process for the preparation of aliphatic organic acids by the interaction of carbon monoxide with saturated aliphatic monohydric alcohols, or compounds which upon hydrolysis give saturated monohydric aliphatic alcohols, at a temperature between 150° C. and 400° C. and a pressure between 25 and 900 atmospheres, the step which comprises conducting the reaction in the presence of a sulfuric acid-boron fluoride complex, obtained by saturating sulfuric acid at 30° C. with boron fluoride.

7. A process for the preparation of aliphatic organic acids and their esters, which comprises reacting carbon monoxide with a compound selected from the group consisting of saturated aliphatic monohydric alcohols and compounds which upon hydrolysis give saturated monohydric aliphatic alcohols, in the presence of a catalyst which is a complex of an inorganic acid and boron fluoride.

DONALD J. LODER.